(12) United States Patent
Brechling et al.

(10) Patent No.: US 11,878,336 B2
(45) Date of Patent: Jan. 23, 2024

(54) GRIPPING DEVICE

(71) Applicant: Hinterkopf GmbH, Eislingen/Fils (DE)

(72) Inventors: Carsten Brechling, Ulm (DE); Florian Waibel, Schwäbisch Gmünd (DE); Antal Miklós Stix, Eislingen/Fils (DE)

(73) Assignee: Hinterkopf GmbH, Eislingen/Fils (DE)

( * ) Notice: Subject to any disclaimer, the term of this patent is extended or adjusted under 35 U.S.C. 154(b) by 168 days.

(21) Appl. No.: 17/696,487

(22) Filed: Mar. 16, 2022

(65) Prior Publication Data

US 2022/0297177 A1 Sep. 22, 2022

(30) Foreign Application Priority Data

Mar. 17, 2021 (EP) .................................... 21163197

(51) Int. Cl.
| | | |
|---|---|---|
| *B23Q 1/00* | (2006.01) | |
| *B25B 11/00* | (2006.01) | |
| *B21D 43/10* | (2006.01) | |
| *B21D 3/16* | (2006.01) | |
| *B21D 51/26* | (2006.01) | |
| *B25B 5/14* | (2006.01) | |

(52) U.S. Cl.
CPC .............. *B21D 43/10* (2013.01); *B21D 3/16* (2013.01); *B21D 51/2638* (2013.01); *B23Q 1/00* (2013.01); *B25B 5/14* (2013.01)

(58) Field of Classification Search
CPC ....... B25B 11/00; B25B 11/02; B65G 47/908; B23Q 1/00
See application file for complete search history.

(56) References Cited

U.S. PATENT DOCUMENTS

| | | | | |
|---|---|---|---|---|
| 3,831,995 A | * | 8/1974 | Duncan ................ | B65G 47/908 294/119.3 |
| 2006/0055099 A1 | * | 3/2006 | Haruna ................ | B23Q 1/0081 269/309 |
| 2022/0048201 A1 | * | 2/2022 | Chisholm ............. | C03B 9/3654 |
| 2022/0297177 A1 | * | 9/2022 | Brechling ........... | B23B 31/1176 |

FOREIGN PATENT DOCUMENTS

| | | | | |
|---|---|---|---|---|
| CN | 115108305 A | * | 9/2022 | ............... B21D 3/16 |
| DE | 1093171 B | | 11/1960 | |
| DE | 202004020036 U1 | * | 7/2005 | ............ B65B 21/12 |
| FR | 1044075 A | | 11/1953 | |
| JP | S58125323 A | | 7/1983 | |
| JP | 10919731 A | | 1/1997 | |

* cited by examiner

*Primary Examiner* — Lee D Wilson
(74) *Attorney, Agent, or Firm* — Hoffmann & Baron, LLP

(57) ABSTRACT

Gripper for gripping a thin-walled aerosol can blank, having a base body which is made of a solid material and which has a bore passing through it along a central axis, an inner surface of the bore being provided with a circumferential radial groove extending outwards in the radial direction, and having a rubber-impregnated workpiece which is received in the radial groove, which has a radially inner gripping surface and a radially outer working surface, the working surface, together with mutually opposite axial surfaces of the radial groove and a radially outer circumferential surface of the radial groove, delimiting a fluid working space, wherein an integrally formed circumferential sealing profile is formed on the gripping ring adjacent to the working surface.

11 Claims, 4 Drawing Sheets

GRIPPING DEVICE

BACKGROUND OF THE INVENTION

The invention relates to a gripper for gripping a thin-walled aerosol can blank, the gripper comprising a base body which is made of a shape-retaining or solid material, wherein a bore extends along a central axis through the base body and wherein an inner surface of the bore being provided with a circumferential radial groove extending outwards in the radial direction, and comprising a gripping ring which is accommodated in the radial groove and is made of a rubber-elastic material, which gripping ring has a radially inner gripping surface for contact with an aerosol can blank and a radially outer working surface, the working surface, together with mutually opposite axial surfaces of the radial groove and a radially outer circumferential surface of the radial groove, delimiting a fluid working space, in particular a compressed air working space.

From JP H09 19731 A, a container holding member is known in which a base body is provided at an inner periphery with an annular groove in which a container holding member is received which is made of an elastic material and which is freely movable in a radial direction, wherein by an air supply in a channel defined by the container holding member and the groove, an outer rear side of the container holding member is acted upon by a compressive force acting radially inwardly to cause the container to be fixed.

SUMMARY OF THE INVENTION

The task of the invention is to provide a gripper which grips the aerosol can blank with an at least almost uniform surface pressure.

This task is solved in that the gripping ring comprises an integral circumferential sealing profile which is located adjacent, in particular directly adjacent, to the working surface. The sealing profile is in one piece with the gripping ring and ensures that the gripping ring is held in the radial groove in a sealing manner and thus limits the fluid working space. It is advantageous that the required number of sealing surfaces is reduced due to the one-piece formation of the sealing profile on the gripper ring. Additional sealing surfaces can be omitted, that otherwise need to be provided between the radial groove and the gripper ring in the case of a separately formed sealing device, as is known from the prior art. Thus, it is possible to effect an advantageous transfer of compressive forces acting on the working surface of the gripping ring to the aerosol can blank, which is to be fixed temporarily. In particular, the gripping ring can be designed with respect to its geometric profile in such a way that the desired homogeneous force transmission from the gripping ring to the outer surface of the aerosol can blank is ensured.

Advantageous further embodiments of the invention are the subject of the subclaims.

It is expedient if the sealing profile has two profile areas which are arranged symmetrically with respect to a plane of symmetry, the plane of symmetry being aligned transversely with respect to the central axis. Each of the profile areas is designed to bear in a sealing manner against a side surface of the radial groove, which side surface is aligned at least substantially in the axial direction, thereby ensuring the desired sealing effect between the base body and the gripping ring. Preferably, it is provided that the opposing side surfaces of the radial groove are aligned parallel to one another and are each designed as flat annular surfaces against which the respective profile areas can bear in a sealing manner.

Preferably, it is provided that the working surface has a greater extension in the axial direction than the gripping surface and that a partial area of the working surface which projects beyond the gripping surface along the center axis forms with the profile area an annular section formed coaxially with the center axis. With such a design of the gripping ring, the working surface is enlarged compared with the gripping surface which results in an introduction of the compressive forces onto the gripping surface in an advantageous manner. In addition it can be provided that those partial areas of the working surface which project beyond the gripping surface in the axial direction are used for the transmission of compressive forces onto the respective profile areas and thus for a radially inwardly directed force introduction onto these profile areas.

In a further development of the invention, it is provided that the profile area has at least one radially inwardly directed sealing surface which is designed for sealing contact with a radially outwardly directed, in particular circular-cylindrical shaped supporting surface of the base body. Here it is advantageous that the sealing effect between the respective profile area and the base body is produced by the compressive forces acting inward in the radial direction. As a result, a relative movement of the gripping ring between a release position for the aerosol can blank, in which the gripping ring has a large inner diameter, and a blocking position for the aerosol can blank, in which the gripping ring has a small inner diameter, is impaired only to a small extent or preferably not at all by frictional forces. Rather, the gripping ring can be transferred at least largely without friction from the release position to the blocking position by the action of the compressive forces, with a complete sealing effect for the sealing ring relative to the base body only being present in the blocking position. A loss of pressurized fluid during the transition of the gripping ring between the release position and the blocking position is practically insignificant with respect to the small amount of fluid which is required to transfer the gripping ring from the release position to the blocking position. Furthermore, this design of the gripping ring realizes a kind of valve function, since when the fluid pressure in the fluid working space is reduced, the sealing effect between the inwardly directed sealing surfaces of the gripping ring and the outwardly directed supporting surfaces of the base body is already cancelled at the beginning of the elastic reverse deformation of the gripping ring from the blocking position to the release position, and hereby an additional venting of the working fluid from the fluid working space can take place through the gap between the gripping ring and the base body, which gap is released due to the reverse deformation of the gripping ring. Such behavior is particularly advantageous when compressed air is used as the working fluid.

In a further embodiment of the invention, it is provided that the profile area has a first sealing surface which is directed inward in the radial direction and which has a first inside diameter and a second sealing surface which is directed inward in the radial direction and which has a second inside diameter, the first inside diameter being larger than the second inside diameter, and that a radially outwardly oriented first supporting surface is formed on the base body opposite the first sealing surface and a radially outwardly oriented second supporting surface is formed opposite the second sealing surface. Hereby, both an increasing sealing effect between the gripping ring and the base body when pressurizing the fluid working chamber with pressurized working fluid and a decreasing sealing effect between the gripping ring and the base body when reducing the pressure for the working fluid in the working chamber can be achieved in an advantageous manner. For example, it can be provided that, starting from the release position for the gripping ring when the fluid working chamber is pressurized, the second sealing surface, which is arranged at a greater distance from the gripping surface in the axial direction first comes into contact with the oppositely arranged end face, while the first sealing surface, which is arranged at a smaller distance from the gripping surface only comes into contact with the oppositely arranged end face when the fluid working chamber is increasingly pressurized. In this case, the second sealing surface ensures a preliminary sealing of the fluid working chamber, whereby a relative movement of a central area of the gripping ring, which also surrounds the gripping surface, is not yet influenced in a significant manner with respect to friction that increases during the transition from the release position to the blocking position. Preferably, the first sealing surface and the opposite supporting surface on the base body as well as the gripping surface and the aerosol can blank to be gripped are matched to each other in such a way that the gripping ring experiences only the smallest possible bulge for the gripping surface when approaching the blocking position in order to ensure the most homogeneous possible surface pressure over the entire gripping surface between the gripping surface and the aerosol can blank.

Preferably, it is provided that an axial extension of the first sealing surface is greater than an axial extension of the first supporting surface and/or that an axial extension of the second sealing surface is smaller than an axial extension of the second supporting surface. This measure is intended to ensure that the gripping ring can always be moved largely without friction between the release position and the blocking position and also in the reverse direction.

It is advantageous if a distance between the opposing axial surfaces of the radial groove is greater than a distance between axial ring surfaces of the gripping ring facing away from each other, adjacent to the gripping surface and opposite the respective axial surfaces. This measure ensures a substantially frictionless relative movement for the gripping ring between the release position and the blocking position.

In a first alternative embodiment of the invention, it is provided that each of the profile areas has an expansion ring extending radially outwardly from the working surface and a retaining ring arranged radially outwardly on the expansion ring, the expansion ring and the retaining ring being arranged coaxially with respect to the central axis, wherein an extension of the expansion ring along the central axis is less than 50 percent of an extension of the retaining ring along the central axis, and wherein the retaining ring bears at least partially against a radially outwardly facing support surface of the base body In particular the retaining ring is fixedly secured to the base body. In this embodiment of the gripper, it is provided that the gripping ring has an inner ring whose inner surface forms the gripping surface and whose outer surface forms the working surface. Preferably, it is provided that the inner ring has an axial extension that is smaller than a distance between the opposing axial surfaces of the radial groove. In order to ensure reliable centering of the inner ring in the base body on the one hand and the required sealing between the gripping ring and the radial groove on the other, two expansion rings extend from the working surface at a distance from one another and are each connected to a retaining ring arranged radially on the outside. The retaining ring is intended to ensure that the gripping ring is fixed to the base body and further to provide a seal for the fluid working space. The expansion ring serves to provide a flexible coupling between the retaining ring, which is preferably fixed in position on the base body, and the inner ring, which is arranged so as to be movable relative to the base body.

In a further development of the first alternative embodiment of the invention, it is provided that the profile area formed by the expansion ring and the retaining ring has a T-shaped profiling in a cross-sectional plane comprising the central axis and/or that the profile area is accommodated in a circumferential groove of the base body, which has a T-shaped profiling in a cross-sectional plane comprising the central axis and has two radially outwardly oriented, circular-cylindrical supporting surfaces arranged at a distance from one another along the central axis for positive contact of radially inwardly oriented circular-cylindrical retaining surfaces of the retaining ring. The T-shaped profiling of the profile area and the corresponding T-shaped profiling of the circumferential groove in the base body ensure reliable support of the gripping ring on the base body. This is due to the fact that the tensile forces exerted by the inner ring via the expansion rings on the respectively assigned retaining rings can be transmitted at least largely symmetrically from the retaining rings to the opposite circular-cylindrical support surfaces of the base body. In particular, this design avoids undesirable tilting of an, for example asymmetrically designed, retaining ring, as could occur in particular with an L-shaped profiling of the retaining ring.

In a second alternative embodiment of the invention, it is provided that the profile area is designed to taper wedge-shaped outwardly in a radial direction in a cross-sectional plane comprising the central axis and is separated from the working surface by a radially inwardly introduced, in particular semicircularly profiled, groove in the retaining ring and is designed for sealing abutment against the opposite axial surface of the radial groove. In this case, the profile areas are designed in the manner of lip seals which are integrally formed on the inner ring and which undergo a pivoting movement of their radially outer end areas when pressure is applied to the fluid working space, thus ensuring sealing contact of the profile areas against the respective adjacent axial surfaces of the radial groove. The groove introduced into the working surface adjacent to the profile area has the task of decoupling the respective profile area from the working surface in such a way that the desired pivoting movement for the radially outer end region of the profile area leads to a reliable sealing effect for the fluid working space when the gripper is used as intended.

For all embodiments of the invention, it is advantageous if the base body has an interface section, preferably formed rotationally symmetrically with respect to the central axis, which is designed for coupling with a receptacle on a workpiece rotary table of a processing machine, in particular a drawing-in machine.

BRIEF DESCRIPTION OF THE DRAWINGS

Advantageous embodiments of the invention are shown in the drawing. Here shows.

DETAILED DESCRIPTION

Figure 1:
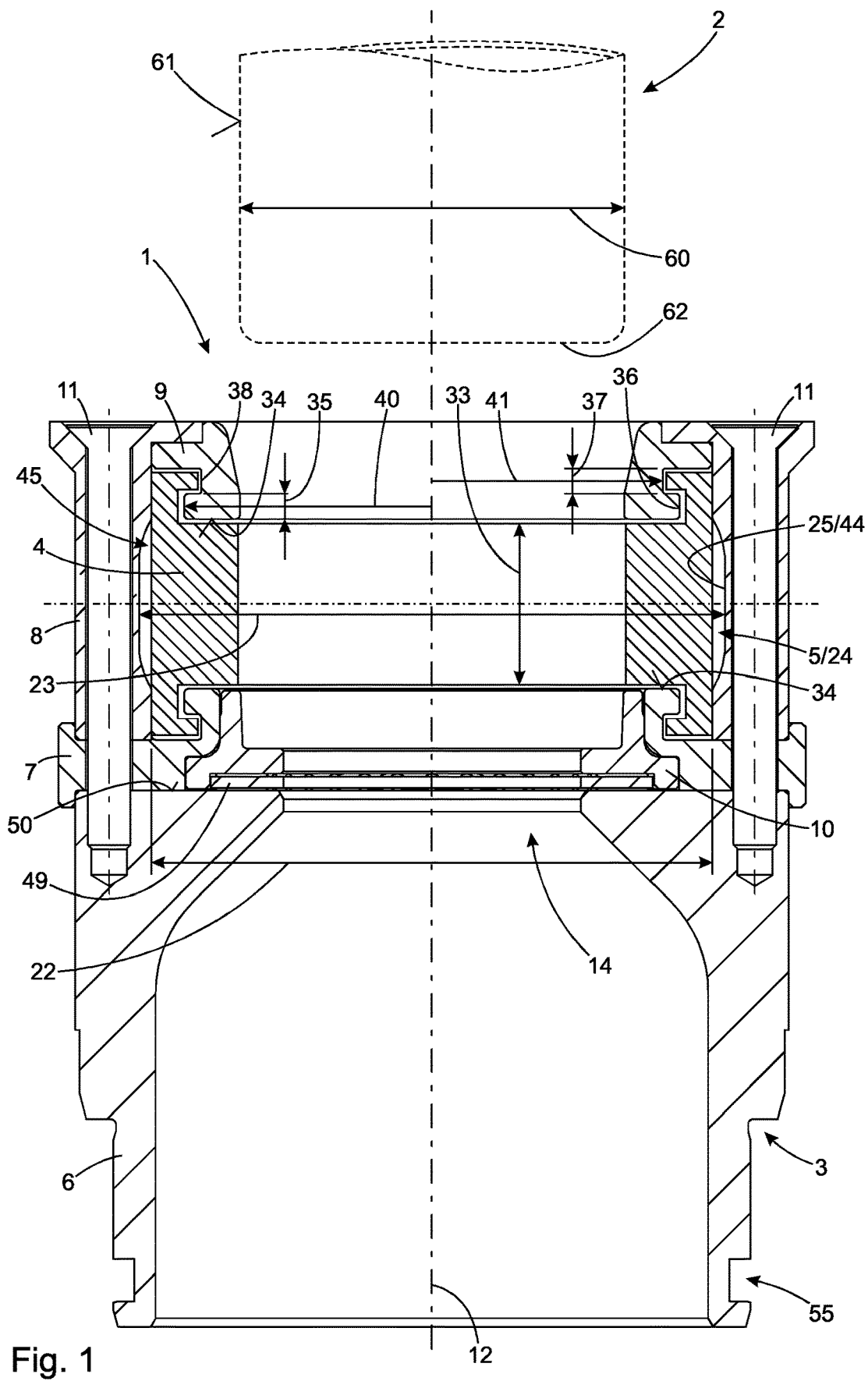
FIG. 1 a schematic sectional view of a first embodiment of a gripper.

A first embodiment of a gripper 1, shown purely schematically in FIG. 1, is used for temporarily securing an aerosol can blank 2, which is shown only schematically and only partially. The aerosol can blank 2 is preferably produced as a circular-cylindrical sleeve which is provided with a base on one side and which is made of an aluminum alloy and has a wall thickness which is well below 0.1 mm Such aerosol can blanks 2 are plastically deformed, for example, on a drawing-in machine at their open end region, so that a spray valve, which is not shown, can be fitted after completion of the plastic deformation. In order to carry out such plastic deformation processes on a necking machine, the aerosol can blank 2 must be reliably fixed in order to be able to support the machining forces occurring during machining. Due to the very small wall thickness of modern aerosol can blanks 2, a force transmission between the aerosol can blank 2 and the gripper 1 is required over the largest possible area with the lowest possible surface pressure in order to avoid collapsing of the aerosol can blank 2.

The gripper 1 comprises a base body 3 which is composed, purely by way of example, of a plurality of components. The components of the base body 3 described in more detail below being made of materials which are dimensionally stable and therefore solid when the gripper 1 is used as intended. Typically, metallic materials such as steel and aluminum as well as plastic materials such as POM or PEEK are used for the components of the base body 3. Furthermore, the gripper 1 comprises a gripping ring 4 made of a rubber-elastic material such as, for example, NBR, which gripping ring 4 is accommodated in a radial groove 5 formed in the base body 3 and which, when pressurized fluid is fed into the radial groove 5, can be transferred from a rest position or release position, which is shown in FIG. 1, into a functional position in which fixing of the aerosol can blank 2 in the gripper 1 is ensured.

Purely by way of example, the base body 3 of the gripper 1 comprises a coupling part 6, an intermediate ring 7, an outer ring 8, a guide ring 9 and a base ring 10. Here it is provided that the intermediate ring 7, the guide ring 9, the base ring 10 as well as the gripping ring 4 are each held in a predetermined position with the aid of the outer ring 8, which in purely exemplary fashion is fixed to the coupling part 6 by means of two fastening screws 11, the gripping ring 4 being accommodated with a certain mobility in the radial groove 5 bounded by the intermediate ring 7, by the outer ring 8 as well as by the guide ring 9. Accordingly, the base body 3 delimits a recess or bore 14 extending along a central axis 12. Furthermore, the base body 3 comprises an interface section 55 formed on the coupling part 6, which is designed for fixing the gripper to a workpiece rotary table, not shown, of a processing machine, in particular a necking or drawing-in machine.

As can be seen from FIG. 1, both the radial groove 5 and the gripping ring 4 each have, in a cross-sectional plane coinciding with the drawing plane of FIG. 1 and including a central axis 12, a profiling which can be described in the broadest sense as W-shaped. It should be noted here that a profiling of the gripping ring 4 and a profiling of the radial groove 5 are, at least almost, geometrically similar in design, the geometric deviations between the profiling of the gripping ring 4 and the profiling of the radial groove 5 being described in more detail below.

Figure 2:
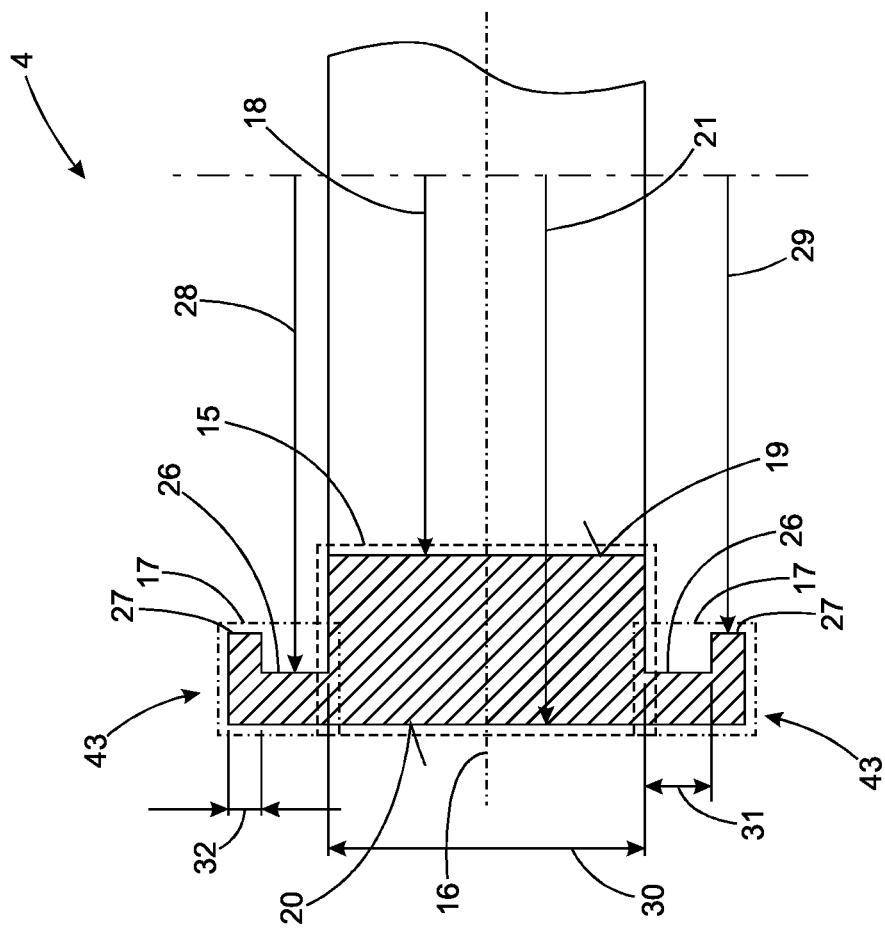
FIG. 2 a detailed representation of a profiling of a gripper ring.

By way of example, the gripping ring 4 according to the detailed representation of FIG. 2 can be described as a combination of an inner ring 15 of rectangular cross-section with L-shaped profiled rings 17 attached to the inner ring 15 in mirror symmetry to a mirror plane 16, wherein the profiled rings 17, which are also referred to as profile areas of the gripping ring 4, each have a radially inwardly facing L-limb and both form a sealing profile 43 respectively.

Purely by way of example, it is provided that in the release position for the gripping ring 4, as shown in FIGS. 1 and 2, an inner diameter 18 of an inner surface 19, also referred to as the gripping surface, of the gripping ring 4 is slightly larger than an outer diameter 60 of the aerosol can blank 2 shown schematically in FIG. 1. This ensures largely friction-free insertion of the aerosol can blank 2 into the gripping ring 4, provided the latter is in its release position.

A radially outer surface 20 of the gripping ring 4, which is also referred to as the working surface, has an outer diameter 21 shown in FIG. 2, which, at least almost, corresponds to a first, small inner diameter 22 of a circumferential surface 44 of the radial groove 5. Preferably, it is provided that the outer surface 20 is formed as a circumferential surface of a circular cylinder. A second, inner diameter 23 of the circumferential surface 44 of the radial groove 5 is larger than the outer diameter 21 of the outer surface 20, as a result of which, even in the release position of the gripping ring 4, a circumferential annular channel 24 is kept free between the outer surface 20 and an inner surface 25 of the intermediate ring 7.

A first sealing surface 26 of purely exemplary circular-cylindrical design and a second sealing surface 27 of purely exemplary circular-cylindrical design are provided on each of the profiled rings 17, a first internal diameter 28 of the first sealing surface 26 being selected to be larger than a second internal diameter 29 of the second sealing surface 27. As can further be seen from the illustration of FIG. 2, the inner ring 15 has an axial extension which is marked with reference number 30. The first sealing surface 26 has an axial extension which is marked with reference number 31. The second sealing surface 27 has an axial extension which is marked with reference number 32.

Exemplarily, it is provided that the radial groove 5, which is geometrically similar to the profiling of the gripping ring 4, is designed in such a way that, in the event of a relative movement of the gripping ring 4 in the radial direction with respect to the base body 3, as little friction as possible occurs between the gripping ring 4 and the base body 3. This is ensured, by way of example, by a distance 33 between axially aligned and opposing annular surfaces 34 of the intermediate ring 7 being greater than the axial extent 30 of the inner ring 15. It is further provided that an axial extension 35 of a radially outwardly directed first supporting surface 36, which is formed in the same manner both on the intermediate ring 7 and on the guide ring 9, is selected to be smaller than the axial extension 31 of the first sealing surface 26. Furthermore, it is provided that an axial extension 37 of a radially outwardly directed second supporting surface 38, which is formed in the same manner both on the intermediate ring 7 and on the guide ring 9, is selected to be larger than the axial extension 32 of the first sealing surface 27.

In addition, it can be provided, as can also be seen from the illustration of FIGS. 1 and 2, that a first outer diameter 40 of the first supporting surface 36, which is formed in the same way on both the intermediate ring 7 and the guide ring 9, is selected to be smaller than the first inner diameter 28 of the first sealing surface 26. In addition or alternatively, it can be provided, as can also be seen from the illustration of FIGS. 1 and 2, that a second outer diameter 41 of the second supporting surface 38, which is formed identically in each case on the intermediate ring 7 and on the guide ring 9, is selected to be smaller than the second inner diameter 29 of the second sealing surface 27.

These measures are intended to ensure that, when the fluid working space 45, which is delimited by the radial groove 5 and the outer surface 20 of the gripping ring 4, which is also referred to as the working surface, is acted upon, there is initially a relative movement of the gripping ring 4 with respect to the base body 3 which is as frictionless as possible and which can be regarded as a constricting movement and during which a reduction in the diameter of the gripping ring 4 takes place. It must be taken into account here that, due to the geometric design of the gripping ring 4 and the radial groove 5, a certain amount of leakage is accepted, so that pressurized working fluid flowing into the fluid working chamber 45 flows at least partially inward in the radial direction. In principle, however, it is assumed that the desired radial displacement of the gripping ring 4 and the associated reduction in diameter for the gripping ring 4 will take place despite a certain amount of leakage of the working fluid. By way of example, the geometries of the gripping ring 4 and the radial groove 5 are matched to one another in such a way that, in the course of this reduction in diameter, the second sealing to surface 27 first comes into sealing contact with the second supporting surface 38, thus terminating a flow of pressurized fluid inward in the radial direction. Due to the axial spacing of the second sealing surfaces 27 from the inner ring 15, a radially inward displacement of the inner ring 15 is made possible as the fluid pressure in the fluid working chamber 45 continues to increase, without causing any undesirable bulging of the inner surface 19 of the inner ring 15, which is also referred to as the gripping surface. Thus, the inner surface 19 comes into surface contact with an outer surface 61 of the aerosol can blank 2 and can thus fix the aerosol can blank 2 in the gripper 1 in a force-fit manner.

However, this non-positive fixing of the aerosol can blank 2 in the gripper 1 typically does not take place until a bottom region 62 of the aerosol can blank 2 is non-positively received in the bottom ring 10, which, purely by way of example, is rotatably received in the intermediate ring 7 and which is rotatably supported on an axial end face 50 of the coupling part 6 via a needle bearing 49, which is not shown in greater detail.

In order to effect a release of the aerosol can blank 2, it is provided to perform a pressure reduction in the fluid working chamber 45. For this purpose, it may be provided that a vent valve, which is connected to the fluid working chamber 45 in fluidic communication and is not shown, is actuated by an associated control device, which is also not shown, in order to allow the pressurized working fluid, in particular compressed air, to escape from the fluid working chamber 45.

Due to the rubber-elastic properties of the gripping ring 4, an elastic deformation, in particular a deformation recovery, of the gripping ring 4 from the blocking position, which is not shown, into the release position according to FIGS. 1 and 2 takes place, which is associated with an increase in the diameter of the gripping ring 4. Accordingly, the frictional connection with the aerosol can blank 2 is released, so that the latter can be removed from the gripper 1 by means of a removal tool. Particularly advantageously, when the pressure for the pressurized working fluid in the fluid working space is reduced, due to the geometric characteristics of the gripping ring 4 and the radial groove 5 described in more detail above, lifting of the second sealing surface in 27 from the associated second supporting surfaces 38 frees up an additional gap through which the pressurized working fluid can flow out of the fluid working space 45 in a radially inward direction, thereby enabling even faster deformation, in particular a deformation recovery, of the gripping ring 4.

In a further development of the gripper according to FIG. 1, it is provided that at least one radially inwardly directed recess is formed on the outer surface of the gripping ring 4, in which a pin connected to the outer ring engages, in order to thereby ensure an anti-rotation device for the gripping ring 4.

In a variation of the gripper according to FIG. 1, the base ring is made in one piece with the intermediate ring, in which case the rotationally movable bearing for the base ring is omitted.

Figure 3:
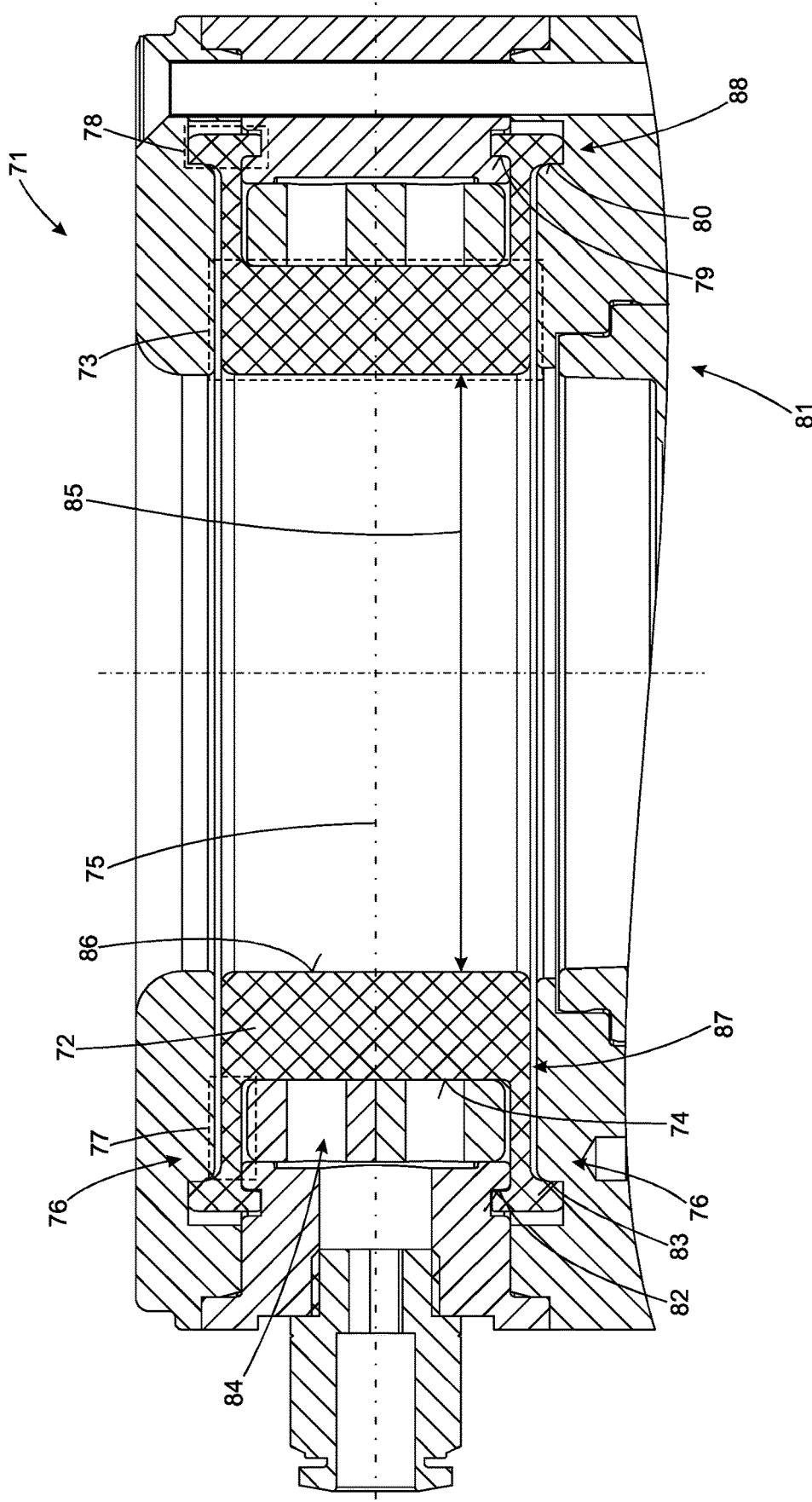
FIG. 3 a schematic sectional view of a second embodiment of a gripper.

In the second embodiment of a gripper 71 as shown in FIG. 3, a substantially similar design is provided for the base body 81 as for the base body 3, so that no more detailed description is provided for the individual components of the base body 81 in order to avoid repetition. Consistent with the gripping ring 4 of the, the gripping ring 72 has an inner ring 73 with a substantially rectangular cross-section. In axial end regions of the gripping ring 72, the outer surface 73, which is also referred to as the working surface, is adjoined in each case by profile areas 76 arranged mirror-symmetrically with respect to a mirror plane 75, which profile areas 76 extend outwards in the radial direction and form a sealing profile 88. Each of the profile areas 76 comprises an expansion ring 77 directly connected to the inner ring 73 and a retaining ring 78 attached to the outside of the expansion ring 77. By way of example, it is provided that a radial extension of the expansion ring 77 starting from the outer surface 74 corresponds approximately to a radial extension of the inner ring 73. It is further provided that an axial extension of the expansion ring 77 corresponds, purely by way of example, to less than 10 percent of an axial extension of the inner ring 73. In contrast, an axial extension for the retaining ring 78 is selected such that it corresponds to at least twice the axial extension of the expansion ring 77. Particularly preferably, it is provided that the retaining ring 78 is arranged substantially centrally with respect to the expansion ring 77, resulting in a substantially T-shaped profiling for the profile area 76. The radial groove 87 in the base body 81, which serves to receive the gripping ring 72, is geometrically similar to the gripping ring 72, at least in certain areas.

As can be seen from the representation of FIG. 3, radially inwardly directed first and second sealing surfaces of the retaining ring 78 are supported on oppositely arranged first and second support surfaces associated with the base body 81 of the gripper 71, as a result of which a sealing effect for the fluid working space 84 is already ensured in the release position according to FIG. 3. Due to the geometric design of the expansion ring 77 and the retaining ring 78, an elastic deformation of the expansion ring 77 is essentially caused when the fluid working space 84 is pressurized and a diameter reduction for the inner ring 73 occurs as a result, while the retaining ring 78 can, at least almost, remain dimensionally stable. Since the expansion ring 77 has a significantly greater elasticity due to its geometric design compared with the inner ring 73, a circular-cylindrical geometry is maintained for an inner surface 86 of the gripping ring 72 when the fluid working space 84 is pressurized and an inner diameter 85 of the gripping ring 71 is reduced as a result, so that a two-dimensional contact of the inner surface 86 with the aerosol can blank occurs without undesirable inhomogeneities occurring with respect to the surface pressure between the inner surface 86 and the aerosol can blank.

Figure 4:
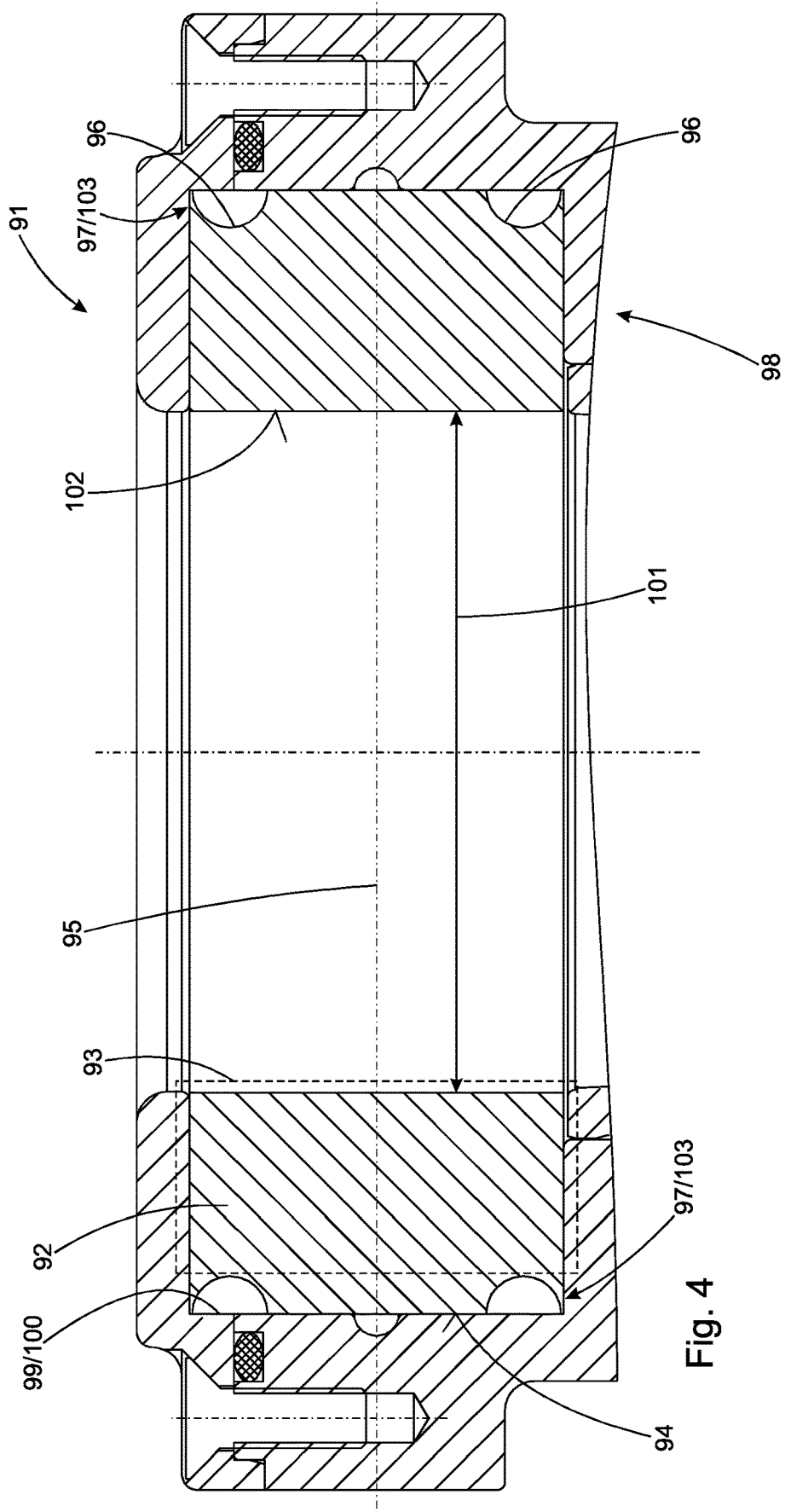
FIG. 4 a schematic representation of a section of a third embodiment of a gripper.

In the third embodiment of a gripper 91 shown in FIG. 4, the gripping ring 92 has, in accordance with the gripping ring 4 according to FIGS. 1 and 2, an inner ring 93 with a substantially rectangular cross-section. In axial end regions of the circular-cylindrical outer surface 94 of the gripping ring 92, circumferential grooves 96 directed inward in the radial direction and arranged mirror-symmetrically to a mirror plane 95 are provided in each case. Purely by way of example, the circumferential grooves 96 each have a semicircular cross-section. The circumferential grooves 96 are placed in such a way that wedge-shaped tapered profile areas 97 are formed in each case at axial end regions of the gripping ring 92, which profile areas 97 have a significantly higher flexibility than the other regions of the gripping ring 92 due to the reduced material thickness and which profile areas 97 form a sealing profile 103. When pressure is applied to the fluid working space 100, which is formed between the gripping ring 92 and the radial groove 99 formed in the base body 98, the profile areas 97 bear sealingly against the respective adjacent annular surfaces 101 of the radial groove 99, which are of purely exemplary annular design, so that sealing of the fluid working space 100 is ensured. With a further pressure build-up in the fluid working chamber 100, the elastic deformation of the gripping ring 92 takes place, which is accompanied by a reduction of the inner diameter 101 of the gripping ring 92, with which the desired frictional fixing of the aerosol can blank to the inner surface 102 of the gripping ring 92, also referred to as the gripping surface, can be effected. As can be seen from the representation of FIG. 4, the radial groove 99 has a rectangular cross-section in the plane of representation according to FIG. 4, so that a particularly cost-effective production of the base body 98 can be realized herewith. In the same way, this also applies to the gripping ring 92, which has no complex geometries.

What is claimed is:

1. A gripper for gripping a thin-walled aerosol can blank, the gripper comprising a base body which is made from a solid material, wherein a bore passes along a central axis through the base body and wherein an inner surface of the bore is provided with a circumferential radial groove extending radially outwardly, the gripper further comprising a gripping ring which is accommodated in the circumferential radial groove and is made of a rubber-elastic material, which gripping ring has a radially inner gripping surface for engagement with the aerosol can blank and a radially outer working surface, wherein the working surface and opposing axial surfaces of the circumferential radial groove and a radially outer peripheral surface of the circumferential radial groove delimit a fluid working space, wherein the gripping ring comprises an integral circumferential sealing profile which is located adjacent to the working surface.

2. The gripper according to claim 1, wherein the sealing profile comprises two profile areas which are arranged symmetrically with respect to a plane of symmetry, the plane of symmetry being aligned transversely with respect to the central axis.

3. The gripper according to claim 2, wherein the working surface has a greater extension in the axial direction than the gripping surface, and wherein a partial region of the working surface, which projects beyond the gripping surface along the central axis, forms with the respective one of the two profile areas an annular section formed coaxially with the central axis.

4. The gripper according to claim 3, wherein each of the two profile areas has at least one radially inwardly directed sealing surface which is designed for sealing contact with a radially outwardly directed supporting surface of the base body.

5. The gripper according to claim 3, wherein each of the two profile areas has a first sealing surface directed inwards in the radial direction with a first internal diameter and a second sealing surface directed inwards in the radial direction with a second internal diameter, the first internal diameter being larger than the second internal diameter, and wherein, on the base body, a radially outwardly oriented first supporting surface is formed opposite the first sealing surface and wherein a radially outwardly oriented second supporting surface is formed opposite the second sealing surface.

6. The gripper according to claim 5, wherein an axial extension of the first sealing surface is greater than an axial extension of the first supporting surface and/or wherein an axial extension of the second sealing surface is smaller than an axial extension of the second supporting surface.

7. The gripper according to claim 3, wherein a distance between the opposing axial surfaces of the radial groove is greater than a distance between mutually remote axial ring surfaces of the gripping ring which are located adjacent to the gripping surface and respectively opposite to the axial surfaces.

8. The gripper according to claim 2, wherein each of the two profile areas comprises an expansion ring extending radially outwardly from the working surface and further comprising a retaining ring which is arranged radially outwardly on the expansion ring, the expansion ring and the retaining ring being arranged coaxially with respect to the central axis, wherein an extension of the expansion ring along the central axis is less than 50 percent of an extension of the retaining ring along the central axis, and wherein the retaining ring rests at least partially against a radially outwardly facing supporting surface of the base body.

9. The gripper according to claim 8, wherein each of the two profile areas comprises the expansion ring and the retaining ring and has a T-shaped profiling in a cross-sectional plane, which comprises the central axis and/or wherein each of the two profile areas is accommodated in a circumferential groove of the base body, which circumferential groove has a T-shaped profiling in a cross-sectional plane comprising the central axis and has two radially outwardly oriented, circular-cylindrical supporting surfaces, which supporting surfaces are arranged at a distance from one another along the central axis for a form-fitting abutment of radially inwardly oriented, circular-cylindrical holding surfaces of the retaining ring.

10. The gripper according to claim 2, wherein each of the two profile areas is profiled in a cross-sectional plane comprising the central axis in a taper wedge-shape which is narrowing in a radial outward direction and each of the two profile areas is separated from the working surface by a radially inwardly extending groove in the gripping ring, wherein each of the two profile areas is provided to sealingly abut against the opposite axial surface of the radial groove.

11. The gripper according to claim 1, wherein the base body has an interface section which is provided to be coupled with a receptacle on a workpiece rotary table of a processing machine.

* * * * *